(12) United States Patent
Bestgen et al.

(10) Patent No.: US 9,311,343 B2
(45) Date of Patent: Apr. 12, 2016

(54) USING A SEQUENCE OBJECT OF A DATABASE

(71) Applicant: International Business Machines Corporation, Armonk, NY (US)

(72) Inventors: Robert J. Bestgen, Rochester, MN (US); Daniel E. Beuch, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/243,212

(22) Filed: Apr. 2, 2014

(65) Prior Publication Data

US 2015/0286659 A1 Oct. 8, 2015

(51) Int. Cl.
G06F 17/30 (2006.01)
H04L 29/08 (2006.01)

(52) U.S. Cl.
CPC ......... *G06F 17/30289* (2013.01); *H04L 67/10* (2013.01)

(58) Field of Classification Search
CPC ............................................. G06F 17/30289
See application file for complete search history.

(56) References Cited

U.S. PATENT DOCUMENTS

| 5,787,439 | A | 7/1998 | Taysom |
| 6,968,432 | B2 | 11/2005 | Croisettier et al. |
| 7,089,356 | B1 | 8/2006 | Chen et al. |
| 8,200,700 | B2 | 6/2012 | Moore et al. |
| 2008/0114816 | A1* | 5/2008 | Shepherd .......... G06F 17/30581 |
| 2009/0150338 | A1 | 6/2009 | Forstie et al. |
| 2013/0145103 | A1 | 6/2013 | Li et al. |
| 2013/0185267 | A1 | 7/2013 | Gatewood et al. |

FOREIGN PATENT DOCUMENTS

WO 9857265 A1 12/1998

OTHER PUBLICATIONS

Biradar, B., Sequence Cache management and Internals—Sql Server 2012, Aug. 19, 2013 http://sqlhints.com/tag/sequence/.
Ding et al., "Improving Cache Performance in Dynamic Applications through Data and Computation Reorganization at Run Time," Proceedings of the ACM SIGPLAN 1999 conference on Programming language design and implementation, May 1999, pp. 229-241, vol. 34, Issue 5, New York, NY, ACM © 1999 D.O.I. 10.1145/301618.301670.
List of IBM Patents or Patent Applications Treated as Related.

* cited by examiner

*Primary Examiner* — William Spieler
(74) *Attorney, Agent, or Firm* — Jay Wahlquist; Feb Cabrasawan

(57) ABSTRACT

A method and system of managing a database is disclosed. The database may be structured to include a sequence object. The sequence object can have a set of sequential values. The set of sequential values may be used as a set of key values for a set of jobs. A count of jobs accessing the sequence object may be monitored. Based on the count of jobs accessing the sequence object, a quantity of sequential values of the set of sequential values may be allocated.

11 Claims, 4 Drawing Sheets

USING A SEQUENCE OBJECT OF A DATABASE

TECHNICAL FIELD

This disclosure relates generally to database management systems and, more particularly, relates to a sequence object.

BACKGROUND

Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to using a sequence object.

SUMMARY

Aspects of the disclosure include a method and system of managing a database. The database may be structured to include a sequence object. The sequence object can have a set of sequential values. The set of sequential values may be used as a set of key values for a set of jobs. A count of jobs accessing the sequence object may be monitored. Based on the count of jobs accessing the sequence object, a quantity of sequential values of the set of sequential values may be allocated.

Aspects of the disclosure start/stop a particular sequence object operation in a database management system (DBMS). Starting/stopping the particular sequence object operation can occur based on a count of jobs using a specific sequence object. For example, starting/stopping the particular sequence object operation may happen in response to the count of jobs using the specific sequence object changing to/from one. Starting/stopping the particular sequence object operation based on the count of jobs using the particular sequence object may have positive impacts on performance, contention, or efficiency of the DBMS.

DETAILED DESCRIPTION

Figure 1:
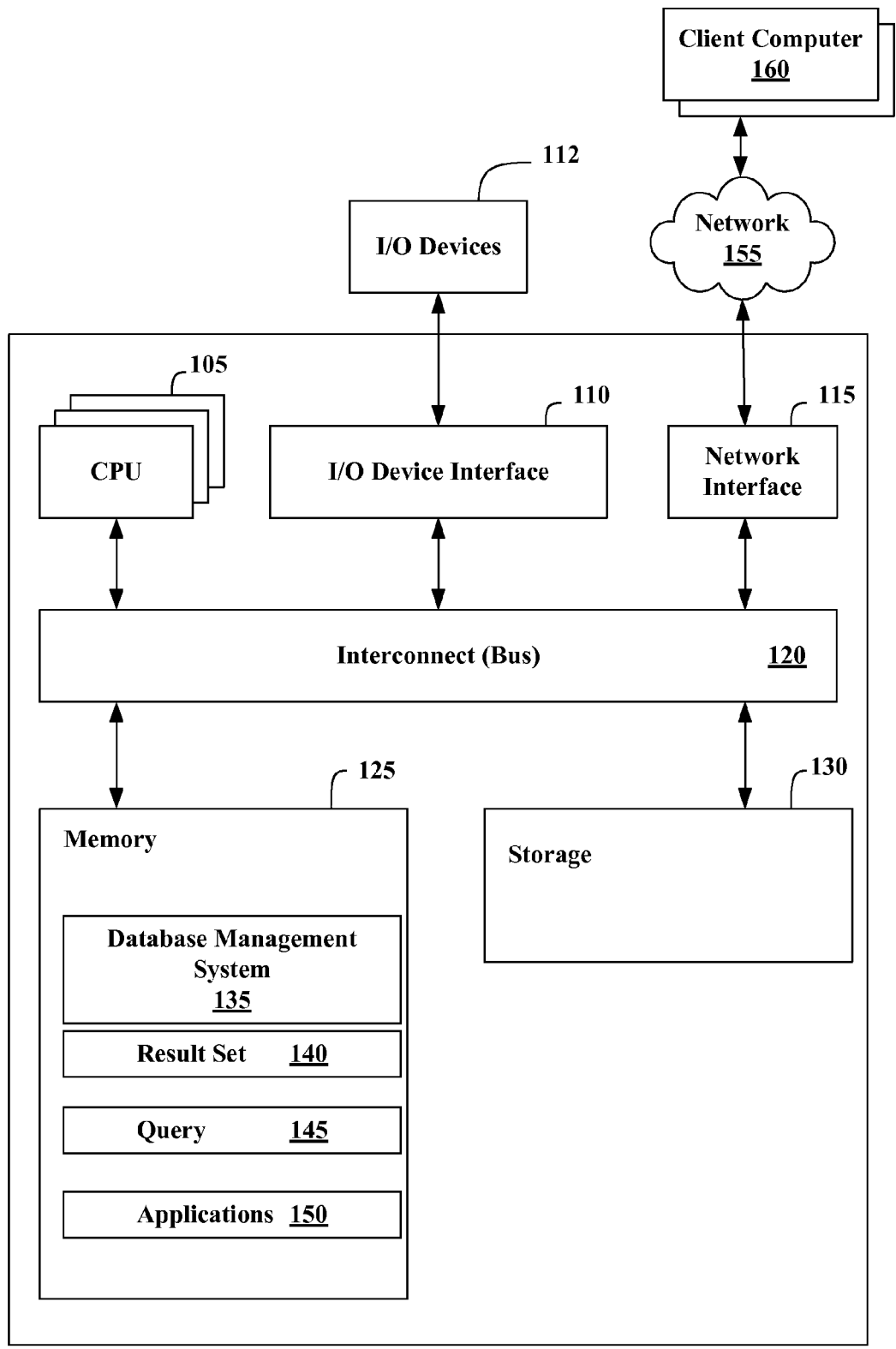
FIG. 1 illustrates an example representation of a computer system connected to a client computer via a network according to an embodiment.

Aspects of the disclosure start/stop a particular sequence object operation in a database management system (DBMS). Starting/stopping the particular sequence object operation can occur based on a count of jobs using a specific sequence object. For example, starting/stopping the particular sequence object operation may happen in response to the count of jobs using the specific sequence object changing to/from one. Starting/stopping the particular sequence object operation based on the count of jobs using the particular sequence object may have positive impacts on performance, contention, or efficiency of the DBMS.

Sequence objects are supported by many DBMSs. As applied, sequence objects can include a way for DBMS users to have a key value that is unique across jobs. Structurally, sequence objects may be physical constructs similar to tables. In practice, sequence objects essentially hold the last value that was handed out.

When multiple jobs desire to access a sequence object at the same time, contention can occur. Since the sequence object is a real object, jobs seize or lock it each time they update it. To reduce contention, sequence objects can support an allocation/caching operation. The allocation/caching operation can reserve a series of values for a job. For example, 1-1000 could be set aside for Job A, 1001-1500 could be set aside for Job B, and 1501-3000 could be set aside for Job C. So long as the DBMS design tolerates gaps in the sequence numbers, such implementation can be effective.

However, some DBMS designs may not tolerate gaps in key values. Even when only a single job is updating the sequence object, performance can have room for improvement. This is because the single job may not be able to risk using the allocation/caching operation since it may not be able to guarantee that another job will not start (e.g., start unexpectedly) and try to use the sequence object. Therefore, starting/stopping the particular sequence object operation based on the count of jobs using the particular sequence object may have positive impacts on performance, contention, or efficiency of the DBMS.

Aspects of the disclosure include a method and system of managing a database. The database may be structured to include a sequence object. The sequence object can have a set of sequential values. The set of sequential values may be used as a set of key values for a set of jobs. A count of jobs accessing the sequence object may be monitored. Based on the count of jobs accessing the sequence object, a quantity of sequential values of the set of sequential values may be allocated.

Aspects of the disclosure include detecting a change in the count of jobs initiating access to the sequence object. Certain aspects of the disclosure include instantiating a request for at least one sequential value within a threshold period of time. In embodiments, the count of jobs accessing the sequence object is one. Correspondingly, the allocated quantity of sequential values is at least one. In such embodiments, in response to a change in the count of jobs accessing the sequence object (i.e., no longer one), not more than one sequential value may be allocated.

Aspects of the disclosure include caching at least one sequential value for at least one job of the set of jobs. In embodiments, the quantity of sequential values may be allocated to a cache for a job of the set of jobs. In certain embodiments in response to the change in the count of jobs accessing the sequence object (e.g., no longer one), at least one sequential value may be returned to the sequence object from the cache for the job. A cycle of allocating/returning sequential values can occur.

In embodiments, the count of jobs accessing the sequence object is not one. Correspondingly, the allocated quantity of sequential values is not more than one. In such embodiments, in response to the count of jobs accessing the sequence object changing to one, at least one sequential value may be allocated. Aspects of the disclosure include establishing an event handling thread for a job of the set of jobs. In embodiments, the event handling thread can be configured to lock the sequence object, unlock the sequence object, interact with other event handling threads, and apportion sequential values. Aspects of the disclosure may have positive impacts on performance, contention, or efficiency of the DBMS.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
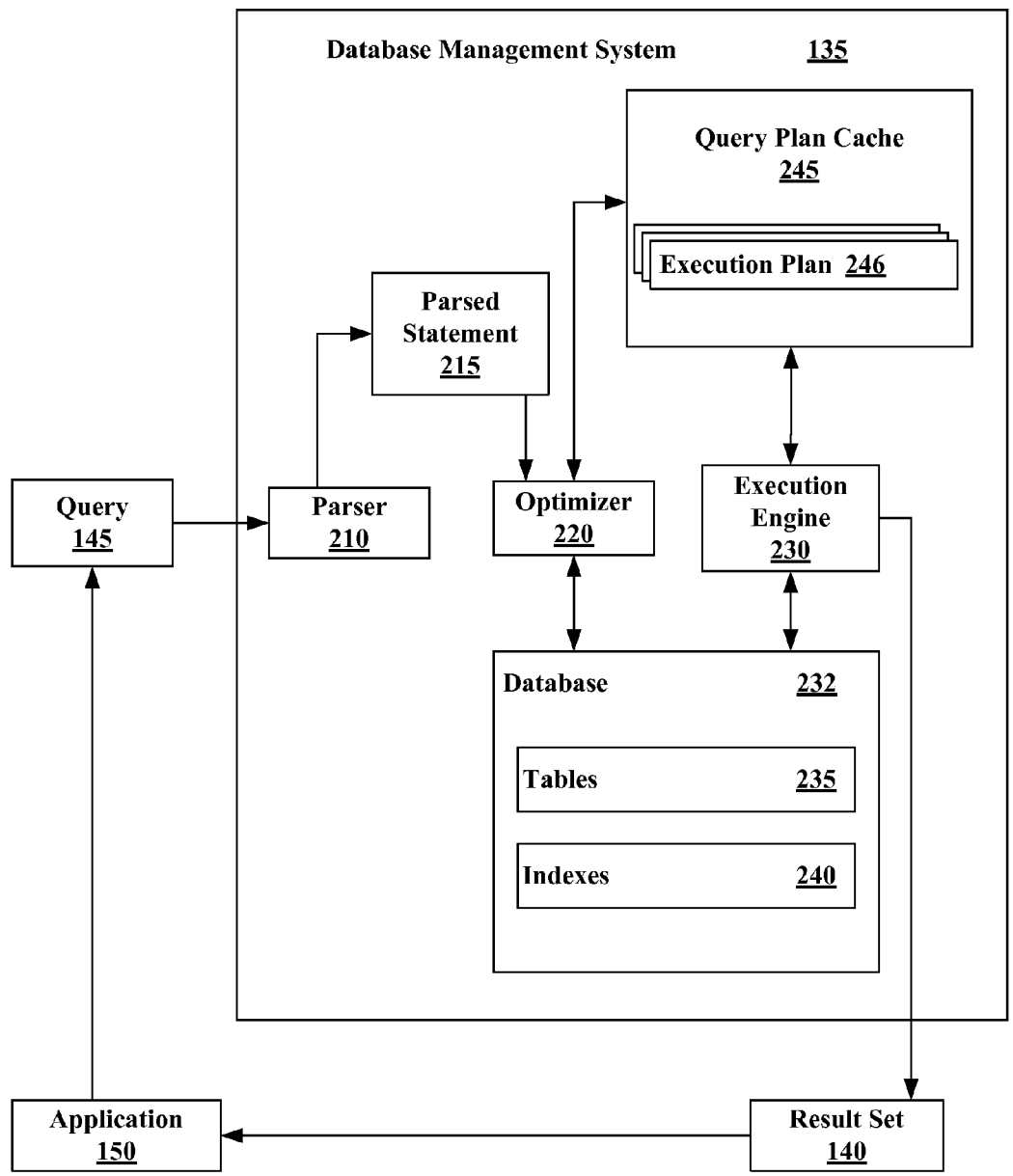
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

Figure 3:
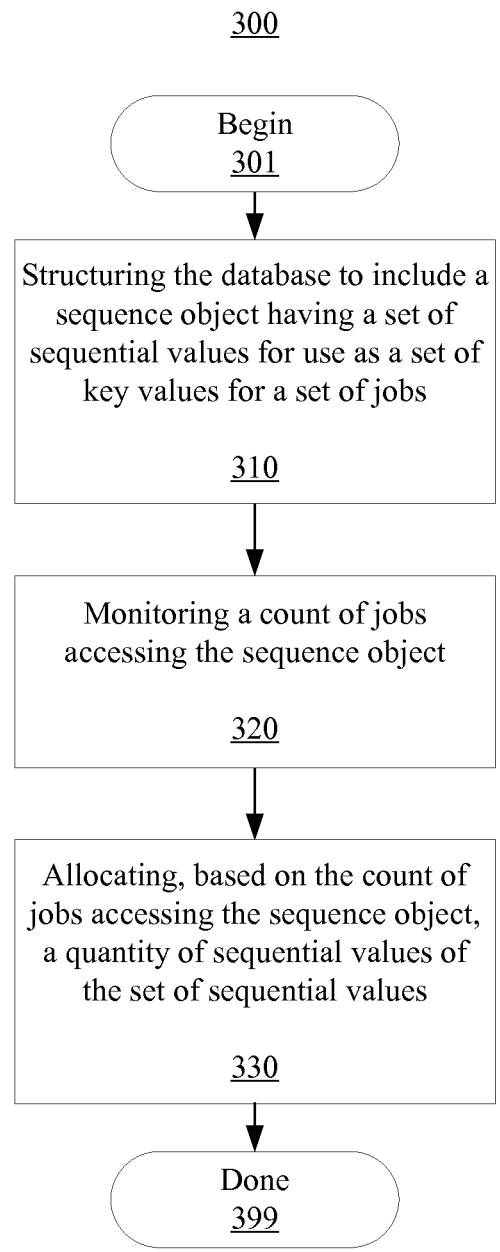
FIG. 3 is a flowchart illustrating a method of managing a database according to embodiments.

FIG. 3 is a flowchart illustrating a method 300 of managing a database according to embodiments. The method 300 begins at block 301. At block 310, the database may be structured to include a sequence object. The sequence object can have a set of sequential values (e.g, 1-2-3-4). The set of sequential values may be used as a set of key values for a set of jobs (e.g., Job A, Job B, Job C). Aspects of the disclosure include establishing an event handling thread for a job of the set of jobs (e.g., the event handling thread may be a part of the job). In embodiments, the event handling thread can be configured to lock (seize) the sequence object (e.g., to tackle contention), unlock (unseize) the sequence object, interact (electronically communicate) with other event handling threads, and apportion sequential values (e.g., assign/reserve/set-aside/distribute sequential values).

At block 320, a count of jobs accessing the sequence object may be monitored. Monitoring the count of jobs can include detecting a change in the count of jobs initiating access to the sequence object. Monitoring/determining the count of jobs may be performed by a gatekeeper, an event handler, a counter embedded in the job, or some other mechanism. A job accessing the sequence object can include the job instantiating a request for at least one sequential value (e.g., the job wants at least one key value to use).

In embodiments, a threshold period of time may be defined for use in determining the count of jobs accessing the sequence object. For example, the threshold period of time may be at a specific instance in time (e.g., perform the count of access requests every day at noon when use tends to be most frequent). In other cases, a period of seconds such as 10 seconds may be used to determine the count (e.g., how many different jobs accessed the sequence object in the previous 10 second period). For instance, if the number of jobs goes from 2 to 1, embodiments may wait for a specified period of time before implicitly starting the particular sequence object operation. Such embodiments may positively impact thrashing related to starting/stopping (e.g., on/off/on). Periods of time of durations in minutes, hours, etc. are contemplated. In embodiments, the count of jobs accessing the sequence object is one. In embodiments, the count of jobs accessing the sequence object is not one (e.g., two or more).

At block 330, a quantity of sequential values of the set of sequential values may be allocated. Allocating the quantity of sequential values may be based on the count of jobs accessing the sequence object (at block 320, above). Allocating can include caching at least one sequential value for at least one job of the set of jobs. In embodiments, the quantity of sequential values may be allocated to a cache for a job of the set of jobs. In certain embodiments in response to the change in the count of jobs accessing the sequence object (e.g., no longer one), at least one sequential value may be returned to the sequence object from the cache for the job. A cycle of allocating/returning sequential values can occur.

Corresponding to embodiments when the count of jobs accessing the sequence object is one, the allocated quantity of sequential values is at least one. In such embodiments, in response to a change in the count of jobs accessing the sequence object (i.e., no longer one), not more than one sequential value may be allocated. Corresponding to embodiments when the count of jobs accessing the sequence object is not one, the allocated quantity of sequential values is not more than one. In such embodiments, in response to the count of jobs accessing the sequence object changing to one, at least one sequential value may be allocated. Method 300 may conclude at block 399. Method 300 may have positive impacts on performance, contention, or efficiency of the DBMS.

Figure 4:
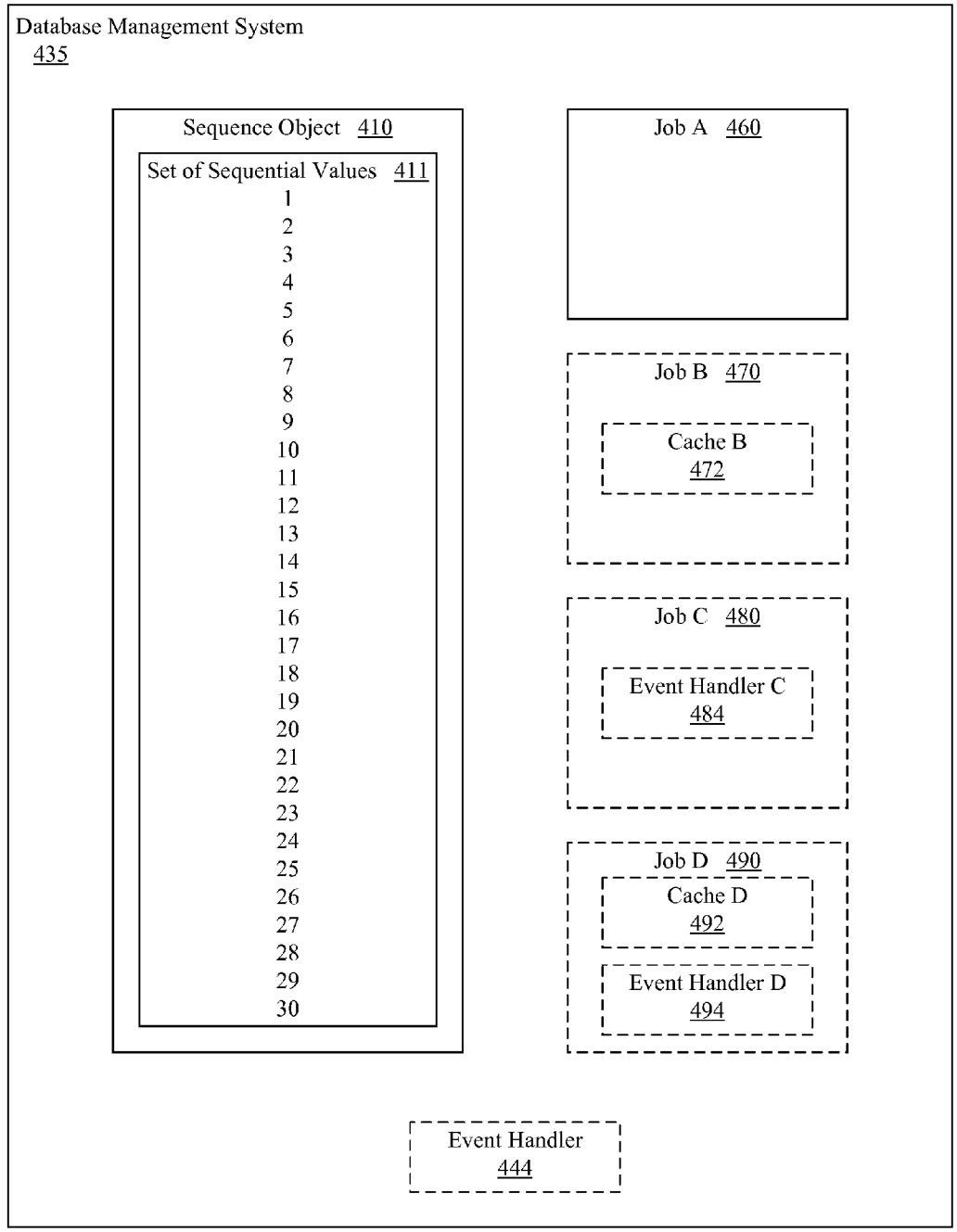
FIG. 4 illustrates an example database management system (DBMS) according to an embodiment.

FIG. 4 illustrates an example database management system (DBMS) 435 according to an embodiment. In embodiments, aspects of method 300 may be consistent with and/or implemented using one or more aspects of the DBMS 435. The DBMS 435 may be structured to include a sequence object 410. The sequence object can have a set of sequential values 411 (e.g., 1-30). The set of sequential values may be used as a set of key values for a set of jobs (e.g., Jobs A-D).

A count of jobs accessing the sequence object may be monitored (e.g., monitored by the sequence object 410, one of the jobs which can include its own event handler, or by an event handler such as the event handler 444 which may be associated with activities of one or more jobs). The event handlers 444, 484, 494 can be configured to lock the sequence object, unlock the sequence object, interact with other event handlers (e.g., to transfer sequential values directly between jobs), and apportion sequential values (e.g., assign/reserve/set-aside/transfer sequential values). In embodiments, an event handler such as event handler 444 can monitor or count the jobs accessing the sequence object.

Based on the count of jobs accessing the sequence object, a quantity of sequential values (e.g., sequential values 11-20) of the set of sequential values may be allocated. Allocating can include caching at least one sequential value for at least one job of the set of jobs. In embodiments, the quantity of sequential values may be allocated to a cache 472, 492. A cycle of allocating/returning sequential values can occur. The event handlers 444, 484, 494 may be used during the cycle.

In embodiments, when the sequence object 410 is opened/accessed for use by a job (e.g., Job A 460), the DBMS may start an event handler 444. In example embodiments, the job may be Job C 480 and the event handler may be Event Handler C 484. In embodiments, if only one job (e.g., Job D 490) is using the sequence object 410, then the Event Handler D 494 may apportion at least one sequential value to Job D 490 (e.g., allocate to Cache D 492 sequential values 9-23). Such operation may allow the job to run efficiently while avoiding gaps in key values. If another job started (e.g., Job C 480) to also use the sequence object 410, Event Handler C 484 may electronically communicate with Event Handler D 494. Event Handler C 484 may request that Event Handler D 494 return any unused sequential values to the sequence object 410 and discontinue caching (e.g., interrupt caching).

In embodiments, Event Handler D 494 may transfer at least one sequential value to Event Handler C 484 (e.g., Job D 490 is complete and instead of returning sequential values to the sequence object 410 they are transferred directly to Job C 480). The jobs (e.g., event handlers of the jobs) may be aware of the particular job using the sequence object 410 at a given time. In embodiments, if a specific job determined that no other job had used the sequence object in a threshold period of time (e.g., predetermined amount of time), the specific job may use the particular sequence object operation (e.g., caching sequential values) for the specific job being serviced.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A computer-implemented method of managing a database, the method comprising:
   structuring the database to include a sequence object having a set of sequential values for use as a set of key values for a set of jobs;
   monitoring a count of jobs accessing the sequence object; and
   allocating, based on the count of jobs accessing the sequence object, a quantity of sequential values of the set of sequential values.

2. The method of claim 1, wherein the count of jobs accessing the sequence object is one and the allocated quantity of sequential values is at least one.

3. The method of claim 2, further comprising allocating, in response to a change in the count of jobs accessing the sequence object, not more than one sequential value.

4. The method of claim 3, further comprising returning, to the sequence object from a cache for a job of the set of jobs in response to allocating the quantity of sequential values to the cache for the job, at least one sequential value.

5. The method of claim 1, wherein the count of jobs accessing the sequence object is not one and the allocated quantity of sequential values is not more than one.

6. The method of claim 5, further comprising allocating, in response to the count of jobs accessing the sequence object changing to one, at least one sequential value.

7. The method of claim 1, wherein monitoring the count of jobs accessing the sequence object includes detecting a change in the count of jobs initiating access to the sequence object and allocating the quantity of sequential values of the set of sequential values includes caching at least one sequential value for at least one job of the set of jobs.

8. The method of claim 1, wherein accessing the sequence object includes instantiating a request for at least one sequential value within a threshold period of time.

9. The method of claim 1, wherein allocating includes establishing an event handling thread for a job of the set of jobs, the event handling thread configured to lock the sequence object, unlock the sequence object, interact with other event handling threads, and apportion sequential values.

10. A computer-implemented method of managing a database, the method comprising:
    structuring the database to include a sequence object having a set of sequential values for use as a set of key values for a set of jobs;
    monitoring a count of jobs accessing the sequence object; and
    allocating, in response to monitoring the count of jobs accessing the sequence object,
        at least one sequential value of the set of sequential values in response to the count of jobs accessing the sequence object being one, and
        not more than one sequential value of the set of sequential values in response to the count of jobs accessing the sequence object being not one.

11. The method of claim 10, further comprising removing, from a cache for a first job of the set of jobs in response to allocating a quantity of sequential values to the cache for the first job, at least one sequential value in response to both a second job instantiating access to the sequence object and the first job not accessing the sequence object for a threshold period of time.

* * * * *